No. 754,827. PATENTED MAR. 15, 1904.
F. M. THOMPSON.
LINE CHALKING DEVICE.
APPLICATION FILED JUNE 10, 1903.
NO MODEL.
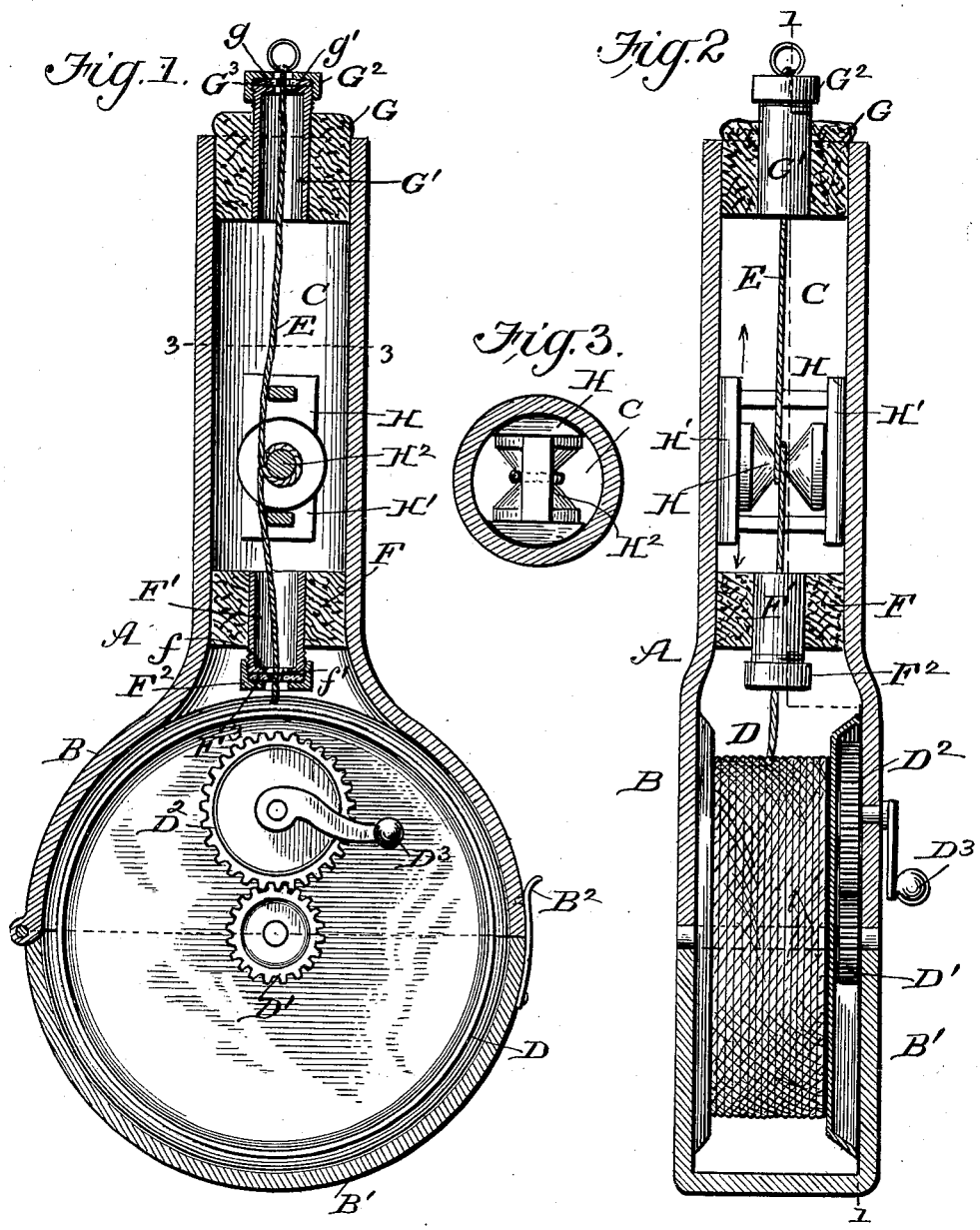
WITNESSES:
Jos. A. Ryan
Percy B. Turpin
INVENTOR
Frank M. Thompson
BY Munn & Co.
ATTORNEYS.

No. 754,827.

Patented March 15, 1904.

UNITED STATES PATENT OFFICE.

FRANK M. THOMPSON, OF EAST LIVERPOOL, OHIO, ASSIGNOR OF TWO-THIRDS TO GEORGE A. MOON AND EDDIE R. SMITH, OF EAST LIVERPOOL, OHIO.

LINE-CHALKING DEVICE.

SPECIFICATION forming part of Letters Patent No. 754,827, dated March 15, 1904.

Application filed June 10, 1903. Serial No. 160,887. (No model.)

*To all whom it may concern:*

Be it known that I, FRANK M. THOMPSON, residing in East Liverpool, in the county of Columbiana and State of Ohio, have invented certain new and useful Improvements in Line-Chalking Devices, of which the following is a specification.

My invention is an improvement in devices for chalking lines for use in marking off lines for any desired purpose; and the invention consists in certain novel constructions and combinations of parts, as will be hereinafter described and claimed.

In the drawings, Figure 1 is a longitudinal section of the device on about line 1 1 of Fig. 2. Fig. 2 is a longitudinal section on about line 2 2 of Fig. 1, and Fig. 3 is a cross-section on about line 3 3 of Fig. 1.

The device includes a casing A, having a body B and a chalk-chamber C extending therefrom. The chamber C is cylindrical in cross-section, and the body B is preferably in the form of a flattened cylinder having a hinged lid B' with a latch B² and provided with bearings for the drum D of the reel, the shaft of said drum having the pinion D', meshed by the gear D², connected with the handle D³, the gear D² and the pinion D' being both arranged within the body B, as best shown in Fig. 2 of the drawings.

The chalk-chamber C communicates at its inner end with the interior of the body B and provides a passage for the line E, which winds upon the drum of the reel, as shown in Fig. 2, and extends thence outwardly through the chamber C. The inner end of the chamber C is partially closed or contracted by the plug F, which may be of cork or similar material, while the outer end of the chamber is closed by the plug G, which may be similar to the plug F, said plugs being provided with longitudinal tubes F' and G', whose outer ends with respect to the chamber C are provided with plates $f$ and $g$, having small openings $f'$ and $g'$, through which the line E passes, and caps F² and G² are threaded on the ends of tubes F' and G' and inclose the perforated disks F³ and G³, which may be of porcelain, glass, or other hard material or may be of rubber, felt, or other suitable soft material.

Ordinarily the disk G³ of the outer plug may preferably be of hard material, with its opening for the line sufficiently large to just wipe off the surplus chalk from the line, while the disk F³ of the inner plug F may preferably be of soft packing material, with its opening for the line small enough to wipe nearly all the chalk off the line as it passes to the reel. The line is chalked in the chamber C between the plugs F and G, and chalk is supplied in suitable quantities to the said chamber.

To prevent the chalk becoming massed at any one point within the chamber and to provide for agitating it by the movement of the line as it is fed out and drawn into the marker, I employ a shuttle H, having their side bars H' conformed on their outer faces to the inner curve of the chamber C, and provided between said side bars with a cross-pin H², around which the line E is coiled, so that as the line is drawn outward through the plug G the shuttle will be moved in the cylinder C toward the said plug G and will be moved in the reverse direction or toward and against the plug F when the line is reeled onto the drum D. The shuttle thus moves from end to end of the chamber C and can revolve therein, so that it will operate to efficiently keep the chalk agitated within the said chamber as desired.

It will thus be noticed that I provide a simple device by which to chalk the line, including the casing having a body for the reeling mechanism, a chamber for the chalk, means controlling communication between said chamber and the reel-chamber, and means controlling the outlet for the line from the chalking-chamber, as well as means for preventing the clogging of the chalk within the chamber, the whole being adapted to be carried in the pocket and to be immediately brought into use whenever desired.

Having thus described my invention, what I claim, and desire to secure by Letters Patent, is—

1. The improvement in line-chalkers herein described comprising the casing having a body for the reel and the reel therein, and the chamber extending from said body and adapted to receive the chalk, plugs at the inner and outer ends of said chamber, tubes extending through said plugs and having end plates perforated for the passage of the line, caps screwed on said tubes, perforated disks held within said caps and against the end plates of the tubes, and the shuttle movable longitudinally in the chalking-chamber between the end plugs thereof substantially as set forth.

2. A line-chalker having a chalking-chamber, an end plug therefor, a tube extending through said plug, a cap on the end of said tube and a disk within the cap and having a perforation for the passage of the line substantially as set forth.

3. A line-chalker comprising the chalking-chamber, the tubes at the opposite ends of and opening at their inner ends into said chamber, the caps on the tubes and having contracted openings for the passage of the line and the plugs receiving said tubes and closing the ends of the chalking-chamber substantially as set forth.

4. The combination in a line-chalker of the chalking-chamber, the plugs fitting in the ends of said chamber, means carried by the plugs for wiping the surplus chalk off the line and the shuttle movable in the chalking-chamber and arranged for operation by the line substantially as set forth.

5. A line-chalker comprising the reel-casing, a chalking-chamber extending from the reel-chamber, a shuttle movable in said chalking-chamber, means for excluding the chalk from the reel-chamber, and means for guarding the outlet for the line from the chalking-chamber substantially as set forth.

6. A line-chalker having a chalking-chamber, and a shuttle movable in the chalking-chamber and arranged for operation by the line substantially as set forth.

7. A line-chalker comprising a chalk-chamber, and a shuttle movable longitudinally therein substantially as set forth.

8. A line-chalker having a chalking-chamber and a shuttle movable longitudinally in the chalking-chamber and having a portion around which the line may be coiled whereby the shuttle may be moved in opposite directions by the line as the latter is correspondingly moved substantially as set forth.

9. A line-chalker comprising the casing having a reel-chamber and a chalk-chamber extending therefrom, plugs at the inner and outer ends of the chalk-chamber and having guarded passages for the line and the shuttle movable longitudinally within the chalk-chamber between the plugs thereof substantially as set forth.

10. A line-chalker comprising a chalk-chamber and a shuttle movable therein and provided with means whereby it may be moved by the line as the latter is moved through the chamber.

11. The combination of the casing having a body for the reeling mechanism and a chamber for the chalk, means controlling communication between the chalk-chamber and the body, means controlling the outlet for the line from the chalking-chamber and an agitating device movable in the chalking-chamber and arranged for operation by the line for preventing the clogging of the chalk within its chamber.

FRANK M. THOMPSON.

Witnesses:
P. V. MACKALL,
A. H. CLARK.